P. B. BOSWORTH.
VEHICLE WHEEL RIM.
APPLICATION FILED DEC. 24, 1909.
977,590.
Patented Dec. 6, 1910.
2 SHEETS—SHEET 1.
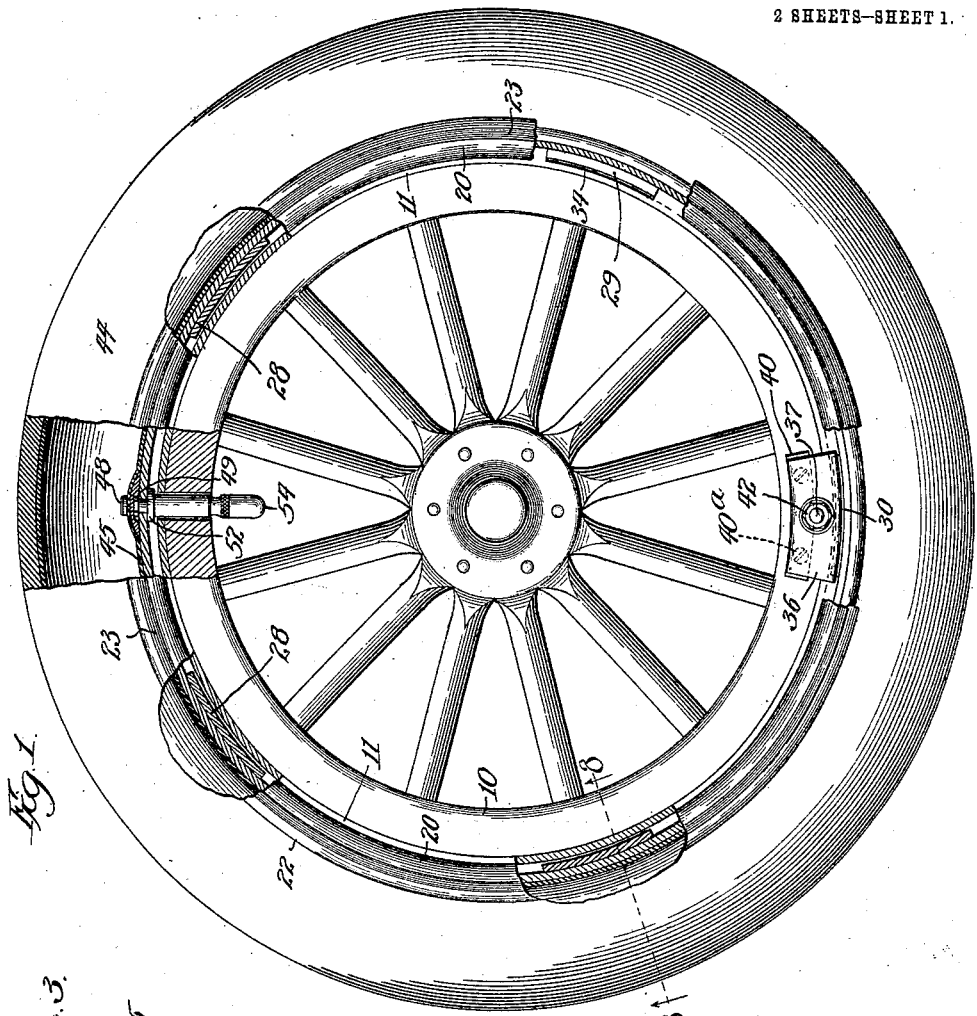
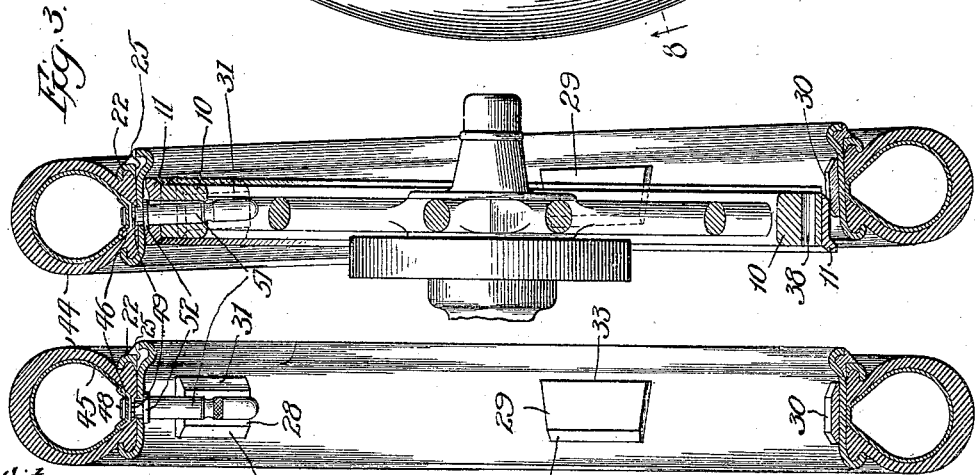

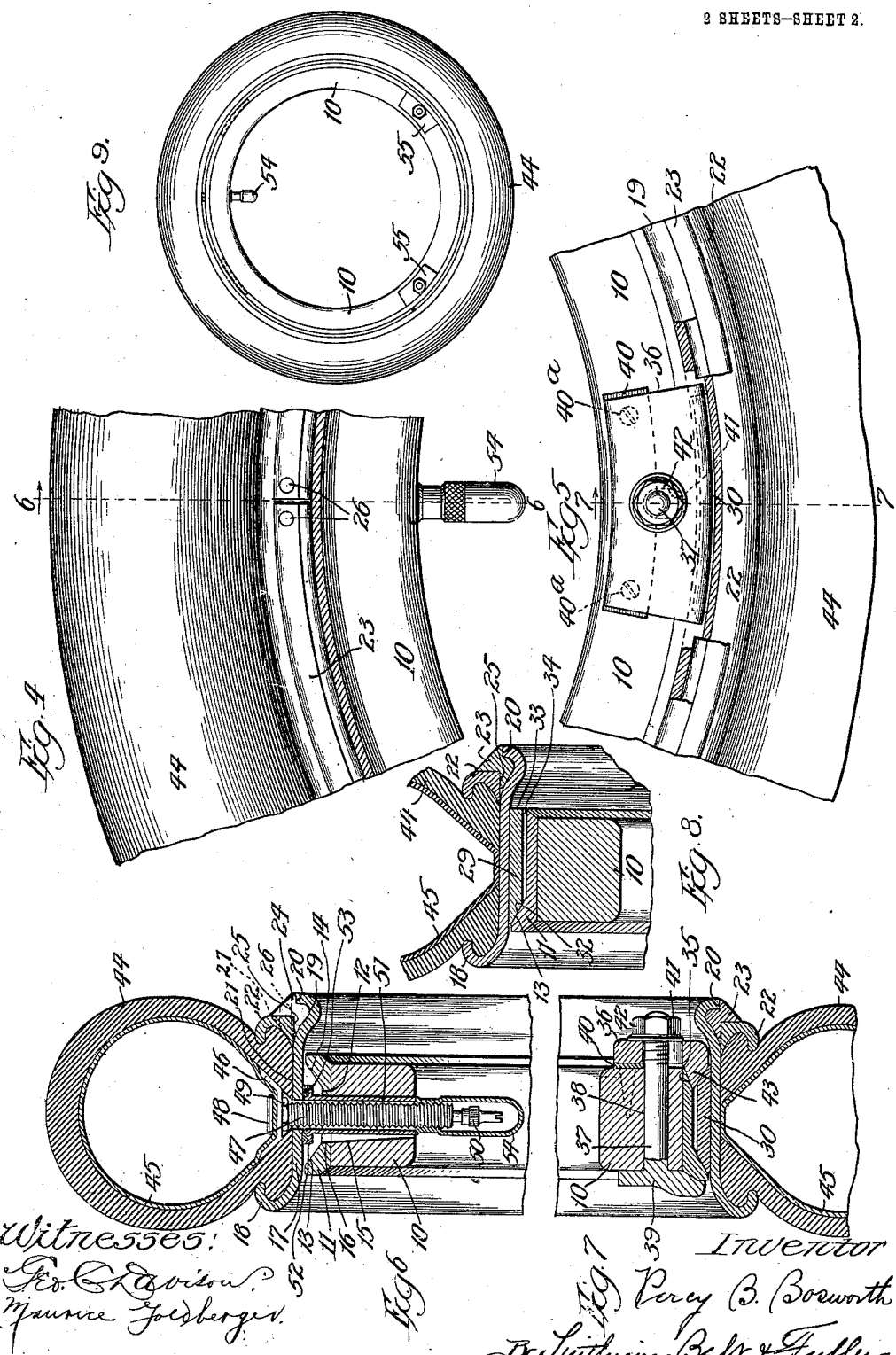

UNITED STATES PATENT OFFICE.

PERCY B. BOSWORTH, OF AKRON, OHIO, ASSIGNOR TO FIRESTONE TIRE & RUBBER COMPANY, OF AKRON, OHIO, A CORPORATION OF WEST VIRGINIA.

VEHICLE-WHEEL RIM.

977,590.                    Specification of Letters Patent.       Patented Dec. 6, 1910.

Application filed December 24, 1909. Serial No. 534,873.

*To all whom it may concern:*

Be it known that I, PERCY B. BOSWORTH, a citizen of the United States, residing at Akron, in the county of Summit and State of Ohio, have invented certain new and useful Improvements in Vehicle-Wheel Rims, of which the following is a specification.

My present invention relates to several features of novelty and improvement in tires and tire rims of the quickly detachable and demountable type, and by my present invention I am enabled to supply a demountable rim which can be taken off of or placed on the wheel with great facility and despatch; one object and aim of the invention being the reduction to a minimum of the number of clamping or similar devices necessary for holding the rim in operative position on the wheel-felly.

Another object and feature of the invention is the provision of means for the ready detachment of the tire when desired without demounting or removing the rim from the wheel. In case two punctures are received in succession, the injurious effects of the first may be readily overcome by replacing the tire and rim with others, but if this second tire should become punctured or otherwise inoperative, it is necessary to detach the same and repair it or replace it with another, and under such circumstances this can be more readily accomplished by leaving the rim on the wheel than otherwise. Heretofore, owing to the inaccessibility of the means for drawing the tire spreader into place, it has been first necessary to demount the rim before the spreader could be released so as to permit detachment of the tire. In my improved construction this control of the spreader is readily effected without interfering with the rim proper.

By means of improvements in the detaching construction of the tire rim, I am enabled to make the same narrower than has been customary and the device of somewhat less width without sacrificing strength.

Referring to the drawings which accompany this specification, which form a part thereof, and which illustrate two embodiments of the invention, it will be noticed that—Figure 1 is a side elevation of a vehicle wheel, portions of which are broken away or sectioned to more clearly illustrate the internal construction; Fig. 2 is a vertical cross-section through the tire and tire-rim; Fig. 3 is a similar view showing the application of the tire and tire-rim to the wheel proper; Fig. 4 is a fragmentary elevation of a part of the wheel, showing the meeting ends of the split locking-ring; Fig. 5 is a fragmentary elevation, partly in section, of the clamping means for holding the tire and rim on the wheel; Fig. 6 is a cross-section on line 6—6 of Fig. 4; Fig. 7 is a cross section on line 7—7 of Fig. 5; Fig. 8 is a section on line 8—8 of Fig. 1; and Fig. 9 is a face view of a wheel of somewhat modified construction.

By reference to the drawings, it will be noticed that the wheel-felly 10 is provided with a metal fixed wheel rim 11 having a circumferential groove 12 provided with divergent or outwardly-flaring side-faces 13 and 14, such felly and fixed rim at one point having registering radial holes or apertures 15 and 16, respectively, for the accommodation of, and somewhat slightly greater in diameter than, the valve-stem sleeve or bushing 51 hereinafter described.

In the particular embodiment shown, the comparatively thin metal tire-rim 17 has at one edge an inturned hook or flange portion 18 to engage the bead of the tire, and near its other edge is formed to provide a depressed angular groove 19, the extreme edge 20 of this tire-rim being substantially in register with the outer surface 21 of the main body thereof. A detachable, inextensible tire ring, or removable flange, 22 forms a part of the construction, engages the opposite bead of the tire as indicated, and is of such internal diameter as to pass over the grooved portion of the tire-rim to occupy the position indicated in Fig. 6. A split locking ring 23 is detachably or removably accommodated in the groove 19, such ring having an outer brace portion 24 overlying and abutting against the surface 20 of the tire rim, outside laterally of the groove. In addition, this split locking ring is cut away on its opposite or inner side so as to provide a surface 25 of the same diameter and in register or concentric with the surface 21 of the tire-rim, whereby the tire-retaining ring 22 may fit over the split locking ring 23 to assist in retaining the same in the groove against the outward pull thereon due to centrifugal force and other causes. If desired, the meeting or adjacent ends of ring 23 may be supplied with inwardly-extended pins 26, 26 adapted to fit in one or more apertures or holes 27 in the adjacent tire-ring 22 to act as a supplemental means for holding the locking ring in its groove under tire deflation and rapid running or rotation of the wheel.

As will be readily understood by those skilled in the art, by proper manipulation of the tire-spreader hereinafter described, the inward shifting of the tire-ring 22, and the removal of the locking ring from its groove, the ring 22 may be readily taken off of the tire-rim laterally thereof and the tire itself detached from its rim. Constructions of this same general character have been known for some time, but by my improved construction the rim may be made somewhat narrower than usual and a less amount of metal used without sacrificing any strength. This is due to the fact that by permitting the tire-ring 22 to overlie the locking ring, as shown, the latter may be positioned nearer the center of the wheel than has been customary heretofore. Owing to the bracing effect secured by the locking ring overlying and abutting against the portion of the rim outside of the groove, a strong and effective tire-holding means is obtained, which, however, permits ready and prompt detachment of the tire when necessary.

The inner surface of the tire-rim 17 has fixed thereto a pair of blocks 28, 28, a pair of blocks 29, and a single block 30 constituting, in the present instance, a total of five, suitably spaced apart, preferably substantially equally. The two blocks 28 are disposed on opposite sides of the valve-stem 47 hereinafter described in detail, and each has a pair of oppositely-disposed inclined or divergent faces 31, 31 shaped to conform to and bear upon the flaring faces 13 and 14 of the fixed rim 11, the blocks, however, when in position in the groove of the fixed rim not reaching to the bottom of such annular depression, so that these wedge or flaring surfaces bear all the strain.

As is clearly indicated in Figs. 2, 3, and 8, each of the pair of blocks 29 is tapered transversely of the rim and has an inclined edge 32 to coöperate with one face of the wheel-groove, the other edge 33 of such block being square so as to be substantially flush or flat with respect to the fixed rim when the demountable tire-rim is in position on the wheel. The block 30 is substantially the same as the bosses or blocks 28, having oppositely-inclined faces for a corresponding purpose.

Although this tire-rim is supplied with the five inner blocks or projections noted, the outer wall of the fixed rim 11 is cut away or omitted only at three points, two characterized 34 to permit the lateral passage of the blocks 29 into the groove, the other hole 35 (Fig. 7) being provided for the entrance of the block 30 into the wheel-groove. Opposite this hole 35 on the detaching face of the wheel I provide a slotted clamp 36 (Fig. 7) held in place by a bolt 37 extended through a felly-hole 38, such bolt having a comparatively large head 39 shaped on its inner surface to conform to the adjacent surfaces of the felly and fixed rim. Between one part of the clamp 36 and the opposite side of the felly I interpose a metallic wear strip 40 secured to the felly by one or more screws $40^a$, or in any other approved manner. This forms a bearing for the clamp and prevents the latter from marring or injuring the face of the wheel-felly. As is clearly shown, the bolt 37 extends through the transverse slot 41 of the clamp, such bolt at its outer end having a nut 42 adapted to bear against the clamp and hold it in operative relation to the demountable tire-rim. At one end or along one edge, this clamp has a wedge or V-shaped part 43, one face of which is adapted to co-act with the adjacent inclined face of the block 30, while the other face co-acts with the inclined or beveled inner margin of the recess or aperture 35, as I have clearly indicated in Fig. 7. From this construction it will be apparent to those skilled in the art, that when the nut 42 is tightened up it forces the clamp inwardly, and by the wedge action of the latter the tire-rim is pressed outwardly so as to have a firm and secure connection with the wheel proper.

The valve-stem and spreader construction of this improved vehicle-wheel possesses certain features of novelty and improvement to accomplish the object stated in the first part of this specification. The tire 44 has disposed inside thereof, and fastened in the usual or any approved manner to the inner, air-tight tube 45, a flaring spreader 46 disposed opposite the pins 26 of the split locking ring and having passing therethrough the axially-apertured, externally-threaded valve-stem 47, which at one end, as is customary, is in communication with the interior of the inner tube 45. A desirable connection between the spreader and this valve-stem is to provide the latter with a head 48 within the inner tube and with a tightening nut 49 screwed up against the bottom of the spreader so that the latter and the threaded valve-stem form a rigid structure. The valve-stem is comparatively long and extends clear through the fixed rim 11 and felly 10, being accommodated by their registering apertures 16 and 15. At its inner end this valve-stem is provided with the usual threaded valve-cap 50 screwed on the reduced end thereof and fitted over such threaded stem within the felly I provide a sleeve 51 enlarged at its outer end, at 52, to secure an effective bearing at such end against the inner face of the tire-rim, a moisture-excluding washer 53 being interposed between the two to prevent the entrance of foreign substances to the tire. This sleeve or bushing terminates, in this particular embodiment, at or about the inner surface of the felly, the threaded stem also having an outer, knurled valve-cap 54 screwed on the inner end of the larger portion of the valve-stem and bearing against the adjacent end of sleeve 51. By turning such valve-cap 54 the sleeve is forced outwardly into firm contact with the tire-rim and the spreader is simultaneously drawn inwardly so as to effectually perform its function of maintaining the inner beaded portions of the tire in proper spaced relation and against the parts 18 and 22, and through the action of such spreader the tire-ring or removable flange 22, is forced outwardly so as to overlie the locking ring 23, thereby securing the same against displacement in its retaining groove.

The operation of this improved construction is practically as follows: Assuming that all parts are in proper operative relation on the wheel and that the tire is accidentally punctured, and assuming also that the automobile is supplied with an additional or auxiliary tire-rim provided with its own inflated tire, the operator demounts or removes from the wheel the punctured tire and its tire-rim without detaching such damaged tire from its rim. This is accomplished in the following manner: The single nut 42 is loosened or backed away on the bolt 37 sufficiently to permit the clamp 36 to be slid inward radially so as to be out of the way of the edge of the block 30. Then this tire and its rim are canted or tilted into the position indicated in Fig. 3, the block 30 passing away from the felly out of the aperture 35 and the two blocks 29 acting similarly, due to the presence of the holes 34 through which they leave the groove 12. This tilting operation is permissible without injury to the valve-stem owing to the fact that the holes 16 and 15 are larger than such stem, as I have clearly shown in Fig. 6. The tire and its rim, after having been thus swung laterally in the direction indicated are then simultaneously shifted upwardly and outwardly as the parts are viewed in this figure, or, rather, in the general direction of the axis of valve-stem 47, so as to remove the retaining blocks 28 from the wheel-groove and to remove the valve-stem from the wheel. The tire and rim are now wholly free from the wheel, and the new or supplemental inflated tire and its rim may be made to take their place by reversing the demounting operations specified; that is, the new rim and its tire are fitted over the wheel so as to cause the entrance of the valve-stem 47 and its associated parts into the alined holes of the felly and fixed rim, the two blocks 28 at the same time passing into or substantially into the fixed rim groove. The tire and its rim are then swung so as to bring them into the same plane as the wheel, and in so doing the two blocks 29 pass into the wheel-groove through the holes 34, the block 30 passing through its hole 35 into the same groove. Clamp 36 is then pushed outwardly into operative relation with the block 30 and the side of the hole 41, and upon tightening the nut 42, block 30 is locked in the wheel-rim or wheel-groove, and due to the wedge action of the part 43 of such clamp, a very firm and secure connection between the tire-rim and the wheel is obtained.

It should be observed from this description that it is merely necessary to actuate but a single clamp to demount from or mount the tire rim on the wheel. It would, of course, be possible to use the two blocks 28 and the block 30 without the additional blocks 29, but inasmuch as one inclined face of each of such latter blocks coöperates with one of the beveled faces of the groove, they assist in maintaining the proper relation between the tire and the wheel and compel the beveled walls of the wheel-groove to withstand the pressure of the tire rim, rather than have the base of such groove perform this function. This is a well recognized advantage of construction, owing to the fact that it is practically impossible to manufacture a tire rim of this size and diameter so as to have its inner surface exactly cylindrical. In any case, it is desirable to maintain the inner surface of the tire-rim and the bottom of the wheel-groove out of contact to prevent rusting together of the two parts.

As is shown in Fig. 8 the blocks or lugs 29 extend to the outer edge of the fixed wheel-rim 11 and by coöperation with the end walls of apertures or holes 34 as indicated in Fig. 1, they assist in preventing the tire and tire rim from traveling annularly around the wheel.

It should be noted that in demounting or removing this tire and its rim it is not at all necessary to manipulate or touch the valve and its stem.

Suppose now that this additional tire is the only auxiliary one carried by the vehicle, and that after having been mounted on the wheel as indicated above, it also becomes punctured, then the operator, instead of demounting this tire and its rim, merely detaches such tire from the tire-rim so as to mend the leak. This detachment is brought about in the following manner: The outer valve-cap 54 is unscrewed from or backed away sufficiently on the threaded valve-stem 47 whereby to permit a sufficient outward movement of the spreader so that the beaded portion of the tire 44 with which the tire-ring or flange 22 coacts may be pushed in sufficiently to permit the ring 22 to be moved farther on to the tire-rim enough so as to free it from the pins 26 and so that it does not now overlie or overlap the split locking ring 23. The latter may then be sprung out of and removed from its depressed groove 19, after which the ring 22 may be taken off by sliding the same over the groove 19, and the tire itself easily detached from its rim. In this connection I desire to call especial attention to the fact that in detaching the tire in this manner no manipulation whatever of the demounting elements is required. Heretofore, in order to detach the tire from its rim, it has first been necessary to demount the tire and tire rim to obtain access to the spreader-controlling nut, which has in such instances been housed between the tire-rim and the felly. The injured tire having been removed in the manner specified, it can be repaired, and replaced by reversing the operations above noted.

Obviously, I have by this invention been enabled to provide a tire which is both readily detachable from its rim and demountable from the wheel, either operation being performed entirely independently of the other. There is, however, a distinct coöperation between the structural features which permit of these two operations, because to reach the desired result it is necessary to provide a spreader-operating means which may be manipulated without demounting the rim, and at the same time this means must be capable of removal with the rim during the demounting without actuation of the same.

Although in this particular embodiment of the device I have shown the tire-rim supplied with five blocks, the number of such blocks is quite immaterial, any suitable number being capable of reaching a like result. In Fig. 9, I have shown a similar wheel supplied with only four of such blocks, two of which are equipped with clamps 55. In each instance it will be observed that the two blocks which enter the groove of the wheel by passing the rim over the same on that side may be spaced apart a certain amount, and that if this distance is exceeded it will be impossible to apply the rim in the manner stated, as, for example, if these two blocks were diametrically opposite one another the rim could not be hooked over the wheel to let both blocks into the groove. Any number of such blocks may be used provided they are properly spaced apart and do not extend around the wheel more than a definite amount.

While I have herein indicated with a considerable degree of particularity the structural features and characteristics of these two embodiments of my invention, I wish to have it understood that the invention is capable of a considerable number of embodiments quite different from those shown in the drawings of this application without departure from the essence and heart of this invention and without the sacrifice of any substantial benefits and advantages.

I wish to direct attention to the fact that certain of the features of construction relating more particularly to the elements associated with the detachment of the tire are set forth and claimed in another co-pending application for Letters Patent, Serial No. 565,084.

I claim:

1. In a device of the character described, the combination of a wheel having a felly with an aperture extended therethrough, a tire rim, means demountably fastening said rim on said felly, a tire clamping member adapted to fit in a tire on said rim, and means in said aperture and projecting inwardly of the wheel beyond the felly adapted to actuate said member, said actuating means being accessible inwardly of the felly for operation when the rim is on the wheel, said actuating means being removable from the felly without manipulation when the tire rim is being demounted from the wheel, substantially as described.

2. In a device of the character described, the combination of a wheel having a felly with an aperture extended therethrough, a tire rim, means for detachably securing a tire to said rim, means demountably fastening said rim on said felly, a tire spreader adapted to fit in a tire on said rim, and means in said aperture and projecting inwardly of the wheel beyond the felly adapted to actuate said spreader, said actuating means being accessible inwardly of the felly for operation when the rim is on the wheel, said actuating means being removable from the felly without manipulation when the tire rim is being demounted from the wheel, substantially as described.

3. In a device of the character described, the combination of a wheel having a felly with an aperture extended therethrough, a tire rim, means demountably fastening said rim on said felly, a tire spreader adapted to fit in a tire on said rim, a threaded stem secured to said spreader and adapted to fit in said aperture, means coöperating with said threaded stem and projecting inwardly of the wheel beyond the felly and adapted to actuate said spreader, said actuating means being accessible inwardly of the felly for operation when the rim is on the wheel, said actuating means being removable from the felly without manipulation when the tire rim is being demounted from the wheel, substantially as described.

4. In a device of the character described, the combination of a wheel having a felly with an aperture extended therethrough, a tire rim, means adapted to detachably secure a tire to said rim, means demountably fastening said rim on said felly, a tire spreader adapted to fit in a tire on said rim, a threaded valve stem secured to said spreader and adapted to fit in the aperture of said felly, means to actuate said spreader including a threaded valve cap projecting inwardly of the wheel beyond the felly and accessible inwardly of the felly for operation when the rim is on the wheel, said valve stem and spreader actuating means being removable from the felly without manipulation when the tire rim is being demounted from the wheel, substantially as described.

5. In a device of the character described, the combination of a wheel having a felly with an aperture extended therethrough, a tire rim, means demountably fastening said rim on said felly, a tire-clamping member adapted to fit in a tire on said rim and having a threaded stem adapted to fit in said aperture, a sleeve on said stem bearing at one end against said tire rim, and a threaded nut on said stem coöperating with said sleeve and projecting inwardly of the wheel beyond the felly, such nut being accessible inwardly of the felly for operation when the rim is on the wheel, said stem, sleeve and nut being removable from the felly without manipulation when the tire rim is being demounted from the wheel, substantially as described.

6. In a device of the character described, the combination of a wheel having a felly with an aperture extended therethrough, a tire rim, means to detachably secure a tire to said rim, means demountably fastening said rim on said felly, a tire spreader adapted to fit in a tire on said rim, a threaded valve stem secured to said spreader and adapted to fit in the aperture of the felly, a sleeve loosely mounted on said valve stem in said aperture and bearing at one end against said rim, a threaded valve cap on said valve stem coöperating with said sleeve and projecting inwardly of the wheel beyond the felly, said valve cap being accessible inwardly of the felly for operation when the rim is on the wheel, said valve stem, sleeve and valve cap being removable from the felly without manipulation when the tire rim is being demounted from the wheel, substantially as described.

7. In a device of the character described, the combination of a wheel having a groove on its periphery, a tire-rim having a plurality of projections on its inner surface adapted to fit in said groove, the side wall of the latter being cut away to permit the entrance of a part of said projections into said groove, whereby the rim may be partially fitted over the wheel with a portion of the projections in the uncut part of the groove and then swung into the plane of the wheel, the cut away feature permitting the remaining projections to enter the groove during such swinging movement, substantially as described.

8. In a device of the character described, the combination of a wheel having a groove in its periphery, a tire-rim having a plurality of projections on its inner surface and adapted to fit in said groove, the side wall of the latter being apertured or cut away to permit the entrance of a portion of said projections into said groove, whereby the rim may be partially fitted over the wheel with a part of the projections in an undercut section of the groove and then swung into the plane of the wheel, the cut away feature permitting the remaining projections to enter the groove, and means coöperating with at least one of said latter projections to hold the same in the groove, substantially as described.

9. In a device of the character described, the combination of a wheel having a groove on its periphery, a tire-rim having a plurality of projections on its inner surface adapted to fit in said groove, the side wall of the latter being apertured or cut away to permit the entrance of a portion of said projections laterally into said groove, whereby the rim may be partially fitted over the wheel with a part of the projections in the unapertured portion of the groove, and then swung into the plane of the wheel, the cut-away feature permitting the remaining projections to enter the groove, and at least one wedge clamp coöperating with said latter projections to hold them in the groove, substantially as described.

10. In a device of the character described, the combination of a wheel having an annular groove on its periphery the wall of which on one side of the wheel is omitted at a plurality of places to provide entrance recesses to said groove, a demountable tire-rim adapted to fit on said wheel having lugs on its inner face adapted to rest in said groove, the number of such lugs being greater than the number of said recesses, and a clamp coacting with one of said lugs to hold it in the groove, at least one of said lugs when the rim is on the wheel residing partially in its entrance recess to the groove, substantially as described.

PERCY B. BOSWORTH.

Witnesses:
S. G. CAVAHUFF,
T. Z. BINKARD.